United States Patent
O'Donovan et al.

(10) Patent No.: US 9,325,595 B1
(45) Date of Patent: Apr. 26, 2016

(54) METHOD AND APPARATUS FOR IDENTIFYING AVAILABLE WORK STATIONS

(71) Applicant: EMC Corporation, Hopkinton, MA (US)

(72) Inventors: John O'Donovan, Ballincollig (IE); Naomi O'Sullivan, Midleton (IE); Hilda M. McCormack, Passage West (IE); Darren O'Keeffe, Montenotte (IE); Richard E. Cussen, Frankfield (IE); Ian Cheasty, White St. (IE); Marie Downey, Glanmire (IE)

(73) Assignee: EMC Corporation, Hopkinton, MA (US)

(*) Notice: Subject to any disclaimer, the term of this patent is extended or adjusted under 35 U.S.C. 154(b) by 465 days.

(21) Appl. No.: 13/827,998

(22) Filed: Mar. 14, 2013

(51) Int. Cl.
*H04L 12/26* (2006.01)
*G06Q 10/00* (2012.01)

(52) U.S. Cl.
CPC .................. *H04L 43/0876* (2013.01)

(58) Field of Classification Search
CPC ..... H04L 12/56; H04L 67/28; H04L 12/1818; H04L 12/1881; H04L 63/107; H04L 43/0882; H04L 12/2602; H04L 12/14; H04L 41/12; H04L 43/0811; H04L 12/2692; H04L 47/822; H04L 41/5054; H04L 43/08; H04L 47/14; H04L 47/801; H04L 47/824; H04L 63/10; H04W 12/06; H04W 48/18; H04W 80/00; H04W 88/16; H04W 92/00; H04W 4/26; H04W 48/16; H04W 84/12; H04W 68/00; H04W 24/00; H04W 48/04; G06F 2221/2111; G06Q 10/06
USPC ........ 370/230, 252; 455/67.13, 445; 700/122; 707/609; 709/205, 217, 219, 223, 224, 709/226; 717/100; 718/105; 726/3, 4, 5, 13
See application file for complete search history.

(56) References Cited

U.S. PATENT DOCUMENTS 8,577,711 B2 * 11/2013 Korecki ............... G06Q 10/087 705/7.15
9,137,117 B2 * 9/2015 Dec ........................ H04L 41/12
(Continued)

FOREIGN PATENT DOCUMENTS

AU 2012100002 A4 2/2012

OTHER PUBLICATIONS

Deskflex, Inc., "Improving Office Productivity: Scheduling, Facility, Hoteling Software: Sharing Desks, Offices, Conference Rooms, and Even Parking Spaces," White Paper, Apr. 2011, 7 pages.
"Get a Better Seat, Automatically!" https://www.myseatfinder.com/, Feb. 2012, 1 page.
Workspace Manager, "Desk Booking: Mobile Device and VOIP Access," http://www.peoplecube.co.uk/wsm-desk-booking-system-mobile-phone-software-access.htm, 2011, 2 pages.
(Continued)

Primary Examiner — Kevin Bates
Assistant Examiner — Ranjan Pant
(74) Attorney, Agent, or Firm — Ryan, Mason & Lewis, LLP

(57) ABSTRACT

A processing device of an information processing system is configured to automatically determine availability status for multiple work stations of an enterprise by monitoring information technology resources associated with respective ones of the work stations. The processing device is further configured to generate availability indicators for the respective work stations based on the determined availability status, and to provide the availability indicators for presentation to one or more users. For example, the processing device may be configured to automatically determine availability status of the work stations by monitoring network ports associated with respective ones of the work stations, with a given one of the work stations being considered unavailable if the corresponding network port is in use and otherwise being considered available. The processing device may deliver the availability indicators to a client application running on a user device in order to facilitate user selection of an available work station.

22 Claims, 3 Drawing Sheets

(56) References Cited

U.S. PATENT DOCUMENTS

| | | | |
|---|---|---|---|
| 2003/0154311 A1* | 8/2003 | Critz | H04W 24/00 709/250 |
| 2004/0243701 A1 | 12/2004 | Hardwicke et al. | |
| 2008/0104285 A1 | 5/2008 | Xiong et al. | |
| 2008/0109289 A1* | 5/2008 | Vivadelli | G06Q 10/02 705/314 |
| 2009/0300174 A1* | 12/2009 | Floris | G06Q 10/10 709/224 |
| 2009/0319595 A1* | 12/2009 | Millmore | H04L 67/24 709/201 |
| 2010/0088140 A1* | 4/2010 | Gil | G06Q 10/063114 705/7.15 |
| 2010/0222081 A1* | 9/2010 | Ward | G01S 5/021 455/456.3 |
| 2010/0267364 A1 | 10/2010 | Smith et al. | |
| 2015/0207686 A1* | 7/2015 | Raleigh | H04L 41/0893 370/329 |

OTHER PUBLICATIONS

NFS Hospitality, "Best of Breed Software Solutions for Restaurants, Hospitality, Conference Venues, Clubs and Corporate Offices," http://www.nfs-hospitality.com/mobile_scheduling_software.html, 1999-2013, 3 pages.

Condeco, "Office Hoteling," http://www.condecosoftware.com/us/condeco/desk_booking/, 2 pages.

Asure Software, "Office Hoteling Software for Hot Desking," http://www.asuresoftware.com/peoplecube/products-resource-scheduler-hoteling.htm, 2012, 3 pages.

Meet US, "MEETUS Hot Desking Software," http://www.meetusglobal.com/hot-desking.html, 2013, 2 pages.

EMC Workplace, "Office Hoteling Software," http://www.dea.com/solutions/software-solutions/Office-Hoteling Software.aspx, 1 page.

System Administration Database, UVA Computer Science, "Desk Locator," http://www.cs.virginia.edu/~csadmin/locator/, 2007, 1 page.

* cited by examiner

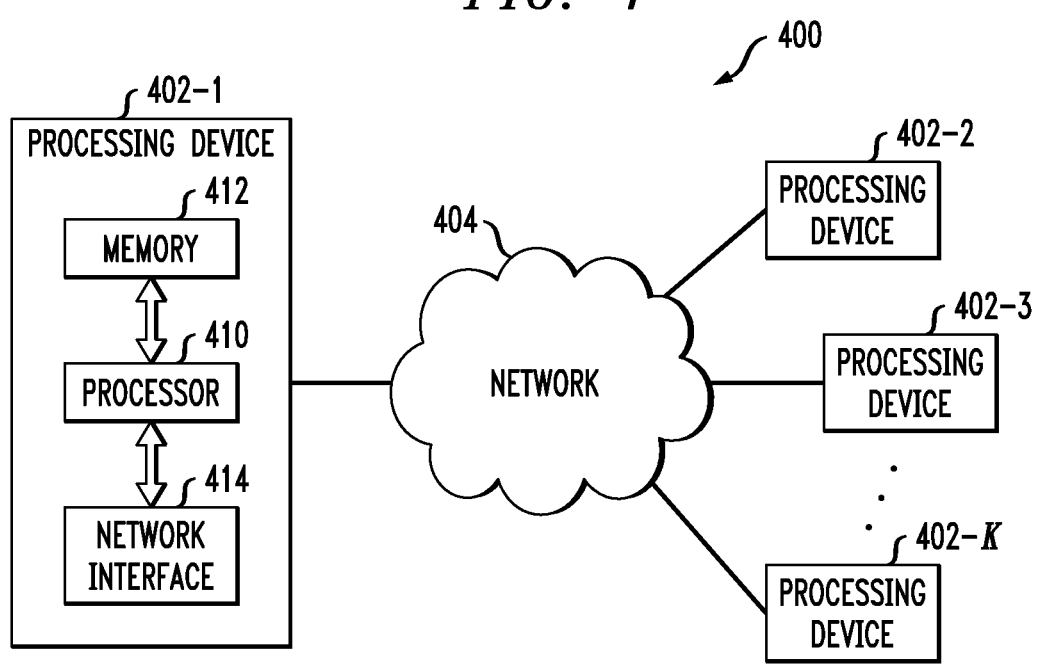

METHOD AND APPARATUS FOR IDENTIFYING AVAILABLE WORK STATIONS

FIELD

The field relates generally to information processing systems, and more particularly to systems comprising multiple work stations that may be time shared by users.

BACKGROUND

Many enterprises today have work forces that include employees working at multiple enterprise facilities, employees working remotely, job-sharing employees, part-time employees or other types of employees that may not have an assigned work station in a given enterprise facility. For example, employees of this type include sales executives or other employees that spend large amounts of time traveling and so may visit enterprise facilities in different geographic locations.

Accordingly, an enterprise facility will often include a certain number of work stations that are intended for use by such employees or other users that are only visiting that facility or otherwise temporarily working within that facility. Arrangements of this type are sometimes referred to as "hot desking" or "hoteling" arrangements. These and other similar arrangements generally involve employees or other users temporarily accessing respective work stations that are not exclusively assigned to any particular user. The time sharing of each such work station among multiple users can provide a significant economic benefit to the enterprise in terms of increased work station utilization and reduced office costs relative to an arrangement in which each employee is assigned his or her own work station.

A number of hot desking or hoteling arrangements are known in the art that allow employees or other users to reserve particular work stations in advance of their visits to a given enterprise facility. Such advance reservations provide reduced stress for the visiting employee by removing the need for that employee to search for an available work station upon arrival at the facility. However, these conventional arrangements are problematic in that they are manually intensive and require extensive user involvement. For example, users may be required to check in and check out at the reserved work station. Users that fail to check in or check out but nonetheless utilize the work station can create confusion regarding the current availability of the work station.

SUMMARY

Illustrative embodiments of the present invention provide improved techniques for identifying available work stations in an information processing system associated with an enterprise. Such arrangements can advantageously avoid the need for a user to check in or check out from a given work station.

In one embodiment, at least one processing device of an information processing system comprises a processor coupled to a memory. The processing device is configured to automatically determine availability status for multiple work stations of an enterprise by monitoring information technology resources associated with respective ones of the work stations. The processing device is further configured to generate availability indicators for the respective work stations based on the determined availability status, and to provide the availability indicators for presentation to one or more users.

By way of example, the processing device may be configured to automatically determine availability status of the work stations by monitoring network ports associated with respective ones of the work stations. In such an arrangement, the availability status of a given one of the work stations may be determined as unavailable if the corresponding network port is in use and may be determined as available if the corresponding network port is not in use. Thus, a given one of the work stations is considered unavailable if the corresponding network port is in use and otherwise is considered available.

The processing device may illustratively comprise a server coupled to the information technology resources of the work stations over at least one network, with the server being configured to provide the availability indicators to a client application running on a mobile phone or other type of user device.

One or more of the illustrative embodiments described herein exhibit significantly improved performance relative to conventional arrangements. For example, automated monitoring of network port usage or other similar operating characteristics associated with information technology resources of the work stations allows substantially more accurate and timely availability indicators to be provided to users, thereby facilitating user selection of an available work station within an enterprise.

BRIEF DESCRIPTION OF THE DRAWINGS

FIG. 4 shows an example of a processing platform that may be used to implement at least a portion of the information processing system of FIG. 1.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
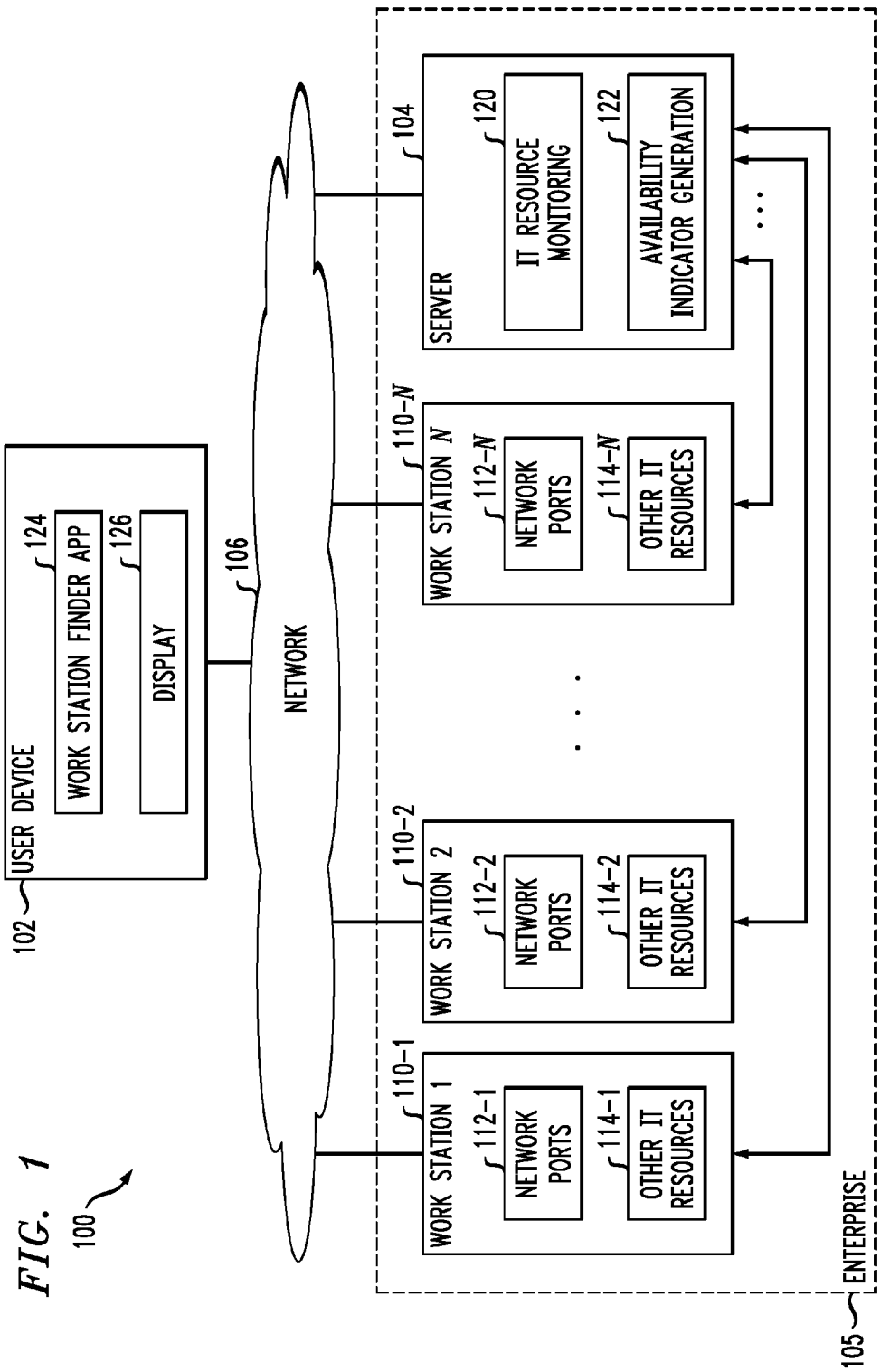
FIG. 1 is a block diagram of information processing system in an illustrative embodiment of the invention.

FIG. 1 shows an information processing system 100 configured in accordance with an illustrative embodiment of the present invention. The information processing system 100 comprises a user device 102 and a server 104 associated with an enterprise 105. The user device 102 and server 104 communicate over a network 106. Also coupled to the network 106 are work stations 110-1, 110-2, . . . 110-N of the enterprise 105. It is assumed that the work stations 110 are not exclusively assigned to any particular users but are instead time shared among multiple users as will be described.

The user device 102 may be implemented as a mobile phone, tablet computer, laptop computer or other type of communication device suitable for interacting with the server 104 over the network 106. The user associated with the user device 102 may be an employee of the enterprise or any other user that requires temporary access to one of the work stations 110 within the enterprise 105. However, it should be noted that the term "user" is intended to be more broadly construed so as to encompass a human user as well as an inanimate system entity. In other contexts herein, the term may refer to a human user, an associated device or set of devices, or a combination of both a human user and an associated device or set of devices. The same reference numeral 102 may be used for all of these cases, with the particular user arrangement being understood from the context.

The system 100 can of course be configured to support a large number of user devices, although only a single user device is shown in the figure for simplicity and clarity of illustration. Also, multiple users may be permitted to access work station availability indicators generated by server 104 from a centralized display within an enterprise facility.

The term "enterprise" as used herein is intended to be broadly construed. For example, the enterprise 105 of system 100 may be viewed as comprising physical infrastructure and associated virtualization infrastructure running on the physical infrastructure, and such information technology infrastructure or portions thereof may be implemented using one or more processing devices of a processing platform. An example of a processing platform that may form at least a portion of the system 100 will be described in more detail below in conjunction with FIG. 4. An enterprise as the term is broadly used herein may denote, for example, a particular facility or multiple facilities of a company, organization or other entity, or may refer to the company, organization or entity itself.

As noted above, the system 100 in the present embodiment implements various processes that provide an enhanced ability for users to identify one or more available work stations among the set of N work stations 110. An example of such a process will be described in conjunction with FIG. 2, but it is to be appreciated that numerous other types of processes may be used in other embodiments.

A given user device 102 or other processing device of the system 100 generally comprises at least one processor and an associated memory, and includes one or more functional modules for controlling certain features of the system 100.

For example, the user device 102 in the present embodiment may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. This memory and other memories disclosed herein may be viewed as examples of what are more generally referred to as "computer program products" storing executable computer program code.

The user device 102 may also include network interface circuitry that is configured to allow the user device to communicate over network 106 with server 104, and possibly with other user devices, and may comprise one or more conventional transceivers.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Similar processor, memory and network interface elements may be utilized in processing devices that provide server 104 and work stations 110. Each of the server 104 and work stations 110 is assumed to be implemented on a corresponding separate processing device, although other arrangements are possible.

The work stations 110-1, 110-2, . . . 110-N comprise respective sets of information technology (IT) resources including network ports 112-1, 112-2, . . . 112-N and other IT resources 114-1, 114-2, . . . 114-N. Different types of IT resources may be associated with different ones of the work stations 110. Such IT resources may comprise networking resources, computing resources, storage resources and other types of resources, in any combination. The IT resources associated with a given one of the work stations 110 may comprise combinations of physical and virtual resources. It is assumed that at least one distinct network port is associated with each of the work stations 110, although one or more of the work stations may each include more than one network port.

The term "work station" as used herein is therefore intended to be broadly construed, and may refer to a desk, cubicle, office, seat or other position or location having at least one network port in a physical area suitable for use as a work space.

In the present embodiment, the server 104 comprises an IT resource monitoring module 120 and an availability indicator generation module 122. The module 120 is configured to automatically determine availability status of the work stations 110 of the enterprise 105 by monitoring IT resources 112 and 114 associated with respective ones of the work stations 110. As noted above, these IT resources include at least one network port for each of the work stations 110. The module 122 is configured to generate availability indicators for the respective work stations 110 based on the availability status determined by module 120.

The server 104 is configured to provide the availability indicators for presentation to one or more users in order to allow those users to identify available work stations in the set of work stations 110. For example, the server 104 in the FIG. 1 embodiment provides the availability indicators over network 106 to a client application 124 running on the user device 102, for presentation on a display 126 of that user device. The client application 124 is more particularly referred to in the figure as a work station finder application, although other types of applications can receive and process availability indicators in other embodiments.

As mentioned previously, it is also possible that the server 104 can provide the availability indicators to a centralized display within or otherwise associated with the enterprise 105, so as to allow those indicators to be simultaneously viewed by multiple users. Thus, for example, the facility may include a television screen at an entrance to a room or other area, with the screen displaying the current availability indicators and associated locations for work stations within that area.

The client application 124 may be implemented as a "seat finder" application that allows a user to easily locate an available seat or other work station having an unused network port within a given facility of the enterprise 105.

The IT resource monitoring module 120 in this embodiment is assumed to monitor at least the one or more network ports 112 associated with respective ones of the work stations 110. More specifically, the module 120 monitors these ports for activity that would ordinarily be associated with users accessing the corresponding work stations. Such activity may comprise, for example, activity that would normally be present on the network port if a user had plugged a laptop computer into the network port, or otherwise accessed the network port in a wired or wireless manner.

Detection of activity for a given network port by the module 120 generally indicates that the corresponding work station 110 is in use and therefore has a status of unavailable. Similarly, the absence of any detected activity for a given network port by the module 120 generally indicates that the corresponding work station 110 is not in use and therefore has a status of available. Accordingly, in the present embodiment, the availability status of a given one of the work stations 110 is determined as unavailable if the corresponding network port 112 is in use and is determined as available if the corresponding network port 112 is not in use.

It should be noted that a certain minimum threshold level of activity should be detected before a decision is made in module 120 regarding the current availability status of the corresponding work station 110.

Although it is expected that any user physically occupying the space associated with a given work station 110 will be very likely to plug in a computer or other device into a network port of the work station, generally in order to obtain higher networking speeds, some users may not do so. Accordingly, the system 100 may be configured to detect additional types of user activity at the corresponding location.

For example, a WiFi locator may be used to identify the locations of WiFi users within the facility, and before a given work station 110 is identified as having an available status an additional determination may be made that there is no WiFi user currently at that location. This is an example of an arrangement in which automatic determination of availability status of the work stations 110 further involves monitoring output of a wireless user locator system to determine if users are accessing wireless networks from locations corresponding to respective ones of the work stations. In such an arrangement, availability status for a given one of the work stations is determined as a function of both detected network port activity and detected wireless network activity at that location. Other additional determinations may involve detection of activity at a work station terminal or telephone.

The availability indicators generated by the module 122 may be mapped to physical locations of the respective work stations 110. For example, the availability indicators may be provided to the application 124 in the user device 102 in association with respective identifiers of the physical locations of the corresponding work stations 110. Thus, in presenting the availability indicators on the display 126, these indicators are generally presented in association with corresponding work station locations or other identifiers that allow the user to determine the location of an available work station.

Also, if a given work station 110 includes multiple network ports, such as a network port box having multiple ports, these multiple ports are generally mapped by the server 104 to a single location, such that if any one of the multiple network ports is in use, that location is considered unavailable.

The availability indicators are therefore presented on the display 126 in a manner that permits the user to select a particular one of the work stations indicated as having an available status. For example, the presentation on display 126 may comprise each of the indicators presented in association with an identifier of its corresponding work station using one of a first characteristic to indicate that the corresponding work station is available and a second characteristic to indicate that the corresponding work station is unavailable.

An example of such a display presentation using green and red colored icons to indicate respective availability or unavailability of a particular work station 110 will be described below in conjunction with FIG. 3. Numerous other types of presentations of availability indicators may be used in the system 100.

In the FIG. 1 embodiment, the module 120 of server 104 automatically determines availability status of the work stations 110 without requiring any user input. This advantageously avoids the need for a user to check in or check out from a given work station using a conventional hot desking or hoteling arrangement. Instead, for example, the user simply goes to an available work station and plugs in a laptop computer or other user device to a given network port 112 of that work station, or otherwise accesses at least one of the network ports of that work station. The system will automatically detect that the corresponding work station is now in use and will update the availability status of that work station accordingly. An updated availability indicator will then be generated and provided via network 106 to one or more user devices of system 100. The availability status information associated with each work station 110 can additionally or alternatively be updated periodically, again without requiring any user input, at predetermined intervals.

Upon connecting to a network port 112 at a particular work station 110, the user can receive other services at the corresponding location. For example, telephone service can be automatically rerouted to that location such that a telephone at the work station will be associated with an extension or other phone number of that user. The normal speed dials and other soft key settings of that user can also be made available at the work station, using techniques that are known in the art.

The system 100 may further incorporate a reservation capability. For example, responsive to presented availability indicators, the server 104 may receive from the user device 102 information indicating selection of a particular one of the work stations 110 having an available status. The server 104 can utilize this information to establish a reservation for the selected available work station 110 on behalf of the corresponding user. The selection information can be received in the server 104 from the application 124 running on the user device 102. Additional information can be exchanged between the user device 102 and the server 104, such as information specifying a particular length of time for which the user wishes to utilize the available work station.

Portions of the user device 102 and the server 104 may each be implemented at least in part in the form of software that is stored in a memory and executed by a processor using one or more processing devices of the type described above. More particularly, the application 124 can be implemented at least in part using software running on the user device 102 and the modules 120 and 122 can be implemented at least in part using software running on one or more processing devices of the enterprise 105.

Although the server 104 is illustratively shown in this embodiment as being arranged within the enterprise 105, in other embodiments the server may be implemented externally to the enterprise.

It is to be appreciated that the particular set of elements shown in FIG. 1 for identifying available work stations is presented by way of illustrative example, and in other embodiments additional or alternative elements may be used. Thus, another embodiment may include additional or alternative arrangements of user devices, work stations, IT resources, applications, servers and other components.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

The operation of the system 100 will now be described in greater detail with reference to the flow diagram of FIG. 2, which shows a set of operations performed in system 100 in an illustrative embodiment.

The process as shown includes steps 200 through 204, which are assumed to be performed using elements of the enterprise 105 such as one or more processing devices utilized to implement server 104 and its associated modules 120 and 122.

In step 200, availability status of the multiple work stations 110 of the enterprise 105 is automatically determined in module 120 of server 104 by monitoring at least the one or more network ports 112 and possibly other IT resources 114 associated with respective ones of the work stations 110.

In step 202, availability indicators are generated by module 122 of server 104 for the respective work stations 110 based on the determined availability status.

In step 204, the availability indicators are provided to the work station finder application 124 running on user device 102 for presentation to the corresponding user via display 126 in order to facilitate user selection of an available work station.

Figure 2:
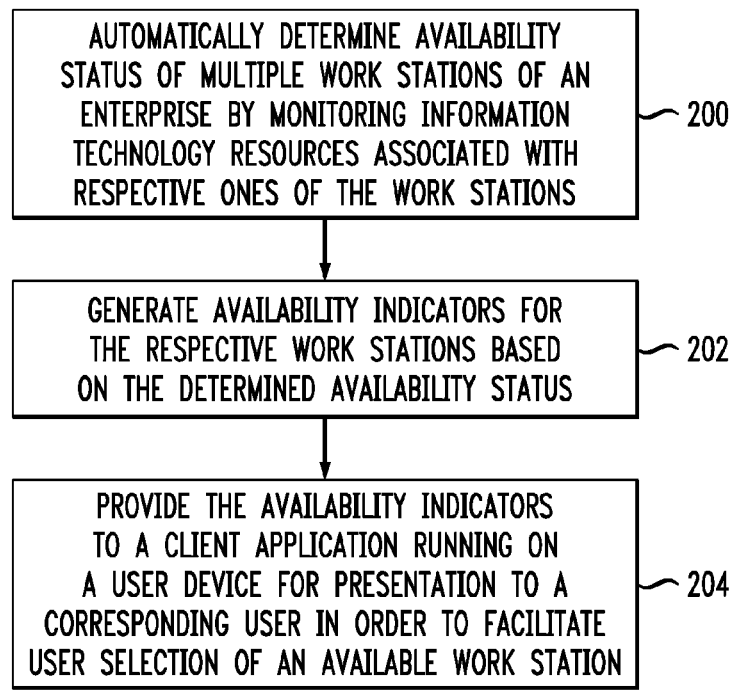
FIG. 2 is a flow diagram of an exemplary process for identifying available work stations in the FIG. 1 system.

The process as illustrated in FIG. 2 may be repeated each time there is a change in detected activity level for one or more of the network ports 112 of the work stations 110. Also, separate instances of the process can be performed with respect to different groupings of user devices and work stations.

The particular processing operations and other system functionality described in conjunction with the flow diagram of FIG. 2 are presented by way of illustrative example only, and should not be construed as limiting the scope of the invention in any way. Alternative embodiments can use other types of processing operations for identifying available work stations to users in system 100. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

Figure 3:
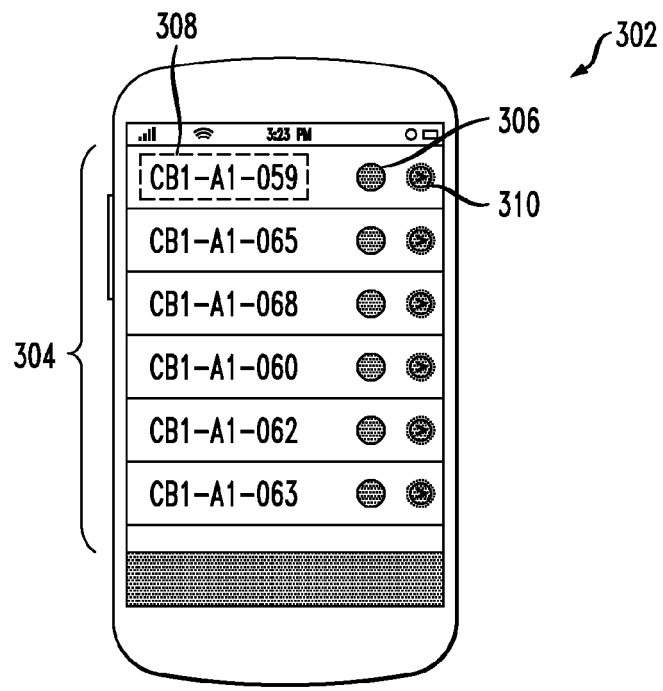
FIG. 3 shows a mobile device having a display on which availability indicators are presented in association with respective work station identifiers.

Referring now to FIG. 3, a user device 302 corresponds to a particular implementation of user device 102 in the form of a mobile phone. The user device 302 is assumed to incorporate the work station finder application 124. The user device 302 includes a display 304 that presents availability indicators 306 in conjunction with respective identifiers 308 of work stations 110. The identifiers 308 in this embodiment comprise respective locations such as CB1-A1-059 each identifying the location of the corresponding work station within an enterprise facility. Also associated with each availability indicator 306 is a corresponding control 310 that when activated will present additional information regarding the corresponding work station, such as a map showing the location of the work station within the enterprise facility, or directions specifying how to reach the work station. The availability indicators 306 in this embodiment are presented using respective traffic light icons, with colors of green and red indicating respective availability or unavailability of the corresponding work stations. Numerous other types of icons or other informational displays can be used to present availability indicators and associated work station identifiers on the user device 302.

The information processing system 100 may incorporate additional functionality relating to identification of available work stations within an enterprise. For example, as noted above, the work station finder application 124 can be configured to allow users to reserve available work stations. As another example, the application 124 may be configured to allow the user to request a notification from server 104 when a particular currently-unavailable work station subsequently becomes available.

Also, the system 100 may be configured to generate facilities reports such as reports of work station utilization over time, thereby allowing the enterprise to determine an optimal number of unassigned work stations and to otherwise more efficiently run its facility. This can result in significant cost savings for the enterprise relative to conventional hot desking or hoteling arrangements.

The set of work stations 110 for which availability indicators are generated in system 100 may include work stations exclusively assigned to users that are currently on vacation or otherwise out of the facility for an extended period of time. The server 104 may interface with other systems such as email or contact systems so as to detect when particular users will not be utilizing a particular assigned work station, possibly based on out-of-office indicators or other similar information.

The above-described embodiments can provide a number of significant advantages relative to conventional practice. For example, automated monitoring of usage of network ports 112 or other similar operating characteristics associated with other IT resources 114 of the work stations 110 allows substantially more accurate and timely availability indicators to be provided to system users, thereby facilitating user selection of an available work station within the enterprise 105. Also, such arrangements can advantageously avoid the need for a user to check in or check out from a given work station.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device."

FIG. 4 shows an example of a processing platform 400 that may be used to implement at least a portion of the information processing system 100.

The processing platform 400 in this embodiment comprises at least a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 4, or each such element may be implemented on a separate processing platform.

At least a portion of a given processing platform as that term is broadly utilized herein may comprise cloud infrastructure. Such cloud infrastructure may comprise virtual machines implemented using a hypervisor that runs on underlying physical infrastructure. The cloud infrastructure further comprises sets of applications running on respective ones of the virtual machines under the control of the hypervisor. The system 100 may of course include multiple hypervisors each providing a set of virtual machines using at least one underlying physical machine.

An example of a commercially available hypervisor platform that may be used to implement a hypervisor and possibly other portions of cloud infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of cloud infrastructure of information processing system 100.

It should again be emphasized that the above-described embodiments of the invention are presented for purposes of illustration only. Many variations and other alternative embodiments may be used. For example, the disclosed techniques are applicable to a wide variety of other types of devices and systems that can benefit from accurate and efficient identification of available work stations without requiring user input. Also, the particular configuration of system and device elements shown in FIGS. 1, 3 and 4, and the process shown in FIG. 2, can be varied in other embodiments. Moreover, the manner in which the IT resources are monitored and the availability indicators are generated and presented on one or more displays may be altered in other embodiments in order to suit the needs of a particular implementation. These and numerous other alternative embodiments within the scope of the appended claims will be readily apparent to those skilled in the art.

What is claimed is:

1. A method comprising the steps of:
    automatically determining availability status of a plurality of work stations of an enterprise by monitoring information technology resources associated with respective ones of the work stations;
    generating availability indicators for the respective work stations based on the determined availability status; and
    providing the availability indicators for presentation to one or more users;
    wherein automatically determining availability status comprises:
    monitoring one or more network ports for each of the work stations;
    monitoring output of a wireless user locator system to determine if users are accessing at least one wireless network from locations corresponding to respective ones of the work stations; and
    if it is determined that the one or more network ports of a given one of the work stations each have a level of activity below a specified minimum threshold level of activity, and that no user is accessing the wireless network from the location corresponding to the given work station, identifying the given work station as available, such that availability status for the given work station is determined as a function of both network port activity at that location and wireless network activity at that location;
    wherein the steps are performed by at least one processing device comprising a processor coupled to a memory.

2. The method of claim 1 wherein providing the availability indicators comprises providing said indicators to a client application running on a user device.

3. The method of claim 1 wherein providing the availability indicators comprises providing said indicators to a centralized display of the enterprise with the centralized display comprising a display screen that is simultaneously accessible to multiple users within the enterprise.

4. The method of claim 1 further comprising the step of mapping the availability indicators to physical locations of the respective work stations.

5. The method of claim 4 wherein providing the availability indicators comprises providing said indicators in association with respective identifiers of the physical locations of the corresponding work stations.

6. The method of claim 1 further comprising the step of presenting the availability indicators on a display accessible to at least a given one of said one or more users in a manner that permits the given user to select a particular one of the work stations indicated as having an available status.

7. The method of claim 6 wherein presenting the availability indicators on a display further comprises presenting each of the indicators in association with an identifier of its corresponding work station using one of a first characteristic to indicate that the corresponding work station is available and a second characteristic to indicate that the corresponding work station is unavailable.

8. The method of claim 7 wherein the first and second characteristics comprise respective green and red colored icons.

9. The method of claim 1 wherein automatically determining availability status of the plurality of work stations further comprises determining availability status without requiring any user input.

10. The method of claim 1 further comprising the step of receiving from a given one of said one or more users information indicating selection of a particular one of the work stations indicated as having an available status.

11. The method of claim 10 wherein receiving the selection information comprises receiving the selection information from a client application running on a user device.

12. The method of claim 1 wherein monitoring one or more network ports for each of the work stations further comprises monitoring the network ports in a manner that does not require any user input.

13. A computer program product comprising a non-transitory processor-readable storage medium having encoded therein executable code of one or more software programs, wherein the one or more software programs when executed cause at least one processing device:
to automatically determine availability status of a plurality of work stations of an enterprise by monitoring information technology resources associated with respective ones of the work stations;
to generate availability indicators for the respective work stations based on the determined availability status; and
to provide the availability indicators for presentation to one or more users;
wherein automatically determining availability status comprises:
monitoring one or more network ports for each of the work stations;
monitoring output of a wireless user locator system to determine if users are accessing at least one wireless network from locations corresponding to respective ones of the work stations; and
if it is determined that the one or more network ports of a given one of the work stations each have a level of activity below a specified minimum threshold level of activity, and that no user is accessing the wireless network from the location corresponding to the given work station, identifying the given work station as available, such that availability status for the given work station is determined as a function of both network port activity at that location and wireless network activity at that location.

14. The computer program product of claim 13 wherein providing the availability indicators comprises providing said indicators to a client application running on a user device.

15. An apparatus comprising:
at least one processing device comprising a processor coupled to a memory;
said at least one processing device being configured to automatically determine availability status of a plurality of work stations of an enterprise by monitoring information technology resources associated with respective ones of the work stations;
wherein said at least one processing device is further configured to generate availability indicators for the respective work stations based on the determined availability status, and to provide the availability indicators for presentation to one or more users;
wherein automatically determining availability status comprises:
monitoring one or more network ports for each of the work stations;
monitoring output of a wireless user locator system to determine if users are accessing at least one wireless network from locations corresponding to respective ones of the work stations; and
if it is determined that the one or more network ports of a given one of the work stations each have a level of activity below a specified minimum threshold level of activity, and that no user is accessing the wireless network from the location corresponding to the given work station, identifying the given work station as available, such that availability status for the given work station is determined as a function of both network port activity at that location and wireless network activity at that location.

16. The apparatus of claim 15 wherein said at least one processing device comprises a server coupled to the information technology resources of the work stations over at least one network, said server being configured to provide the availability indicators to a client application running on a user device.

17. An information processing system comprising the apparatus of claim 15.

18. The apparatus of claim 15 wherein monitoring one or more network ports for each of the work stations further comprises monitoring the network ports in a manner that does not require any user input.

19. A method comprising the steps of:
receiving a plurality of availability indicators generated for respective ones of a plurality of work stations of an enterprise;
displaying the availability indicators; and
permitting selection of a particular one of the work stations based on the displayed availability indicators;
wherein the availability indicators are generated based on an automatic determination of availability status of the work stations implemented by monitoring information technology resources associated with respective ones of the work stations;
wherein automatically determining availability status comprises:
monitoring one or more network ports for each of the work stations;
monitoring output of a wireless user locator system to determine if users are accessing at least one wireless network from locations corresponding to respective ones of the work stations; and
if it is determined that the one or more network ports of a given one of the work stations each have a level of activity below a specified minimum threshold level of activity, and that no user is accessing the wireless network from the location corresponding to the given work station, identifying the given work station as available, such that availability status for the given work station is determined as a function of both network port activity at that location and wireless network activity at that location; and
wherein the steps are performed by at least one processing device comprising a processor coupled to a memory.

20. The method of claim 19 further comprising:
providing a client application running on a user device; and
configuring the client application to permit a user associated with the user device to request a notification when a particular currently-unavailable work station subsequently becomes available.

21. An apparatus comprising:
at least one processing device comprising a processor coupled to a memory;
said at least one processing device being configured to receive a plurality of availability indicators generated for respective ones of a plurality of work stations of an enterprise, to display the availability indicators, and to permit selection of a particular one of the work stations based on the displayed availability indicators;
wherein the availability indicators are generated based on an automatic determination of availability status of the work stations implemented by monitoring information technology resources associated with respective ones of the work stations; and
wherein automatically determining availability status comprises:
monitoring one or more network ports for each of the work stations;

monitoring output of a wireless user locator system to determine if users are accessing at least one wireless network from locations corresponding to respective ones of the work stations; and if it is determined that the one or more network ports of a given one of the work stations each have a level of activity below a specified minimum threshold level of activity, and that no user is accessing the wireless network from the location corresponding to the given work station, identifying the given work station as available, such that availability status for the given work station is determined as a function of both network port activity at that location and wireless network activity at that location.

22. The apparatus of claim 21 further comprising:

a client application running on a user device;

wherein the client application is configured to permit a user associated with the user device to request a notification when a particular currently-unavailable work station subsequently becomes available.

* * * * *